United States Patent [19]

Degg

[11] 4,197,264
[45] Apr. 8, 1980

[54] TOWER PACKING ELEMENTS

[75] Inventor: Anthony Degg, Kirkby Stephen, England

[73] Assignee: Fractionation Research Limited, Kendal, England

[21] Appl. No.: 805,852

[22] Filed: Jun. 13, 1977

[30] Foreign Application Priority Data

Jun. 11, 1976 [GB] United Kingdom ............... 24383/76

[51] Int. Cl.² .............................................. B01F 3/04
[52] U.S. Cl. ............................. 261/98; 261/DIG. 72; 138/38
[58] Field of Search ......................... 138/157, 38, 103; 261/DIG. 72, 98

[56] References Cited

U.S. PATENT DOCUMENTS

| 1,946,694 | 2/1934 | Hunter | 138/157 |
| 2,054,703 | 9/1936 | Little et al. | 138/103 |
| 3,266,787 | 8/1966 | Echert | 261/DIG. 72 |
| 3,311,356 | 3/1967 | Echert | 261/DIG. 72 |
| 3,736,961 | 6/1973 | Walsh | 138/38 |
| 4,041,113 | 8/1977 | McKeown | 261/DIG. 72 |

Primary Examiner—Robert I. Smith
Attorney, Agent, or Firm—Wigman & Cohen

[57] ABSTRACT

An improved packing element for a fluid-fluid contact apparatus is formed from pieces of sheet material; the elements contain a pair of curved strips connected together at their ends by a pair of generally coplanar bridge members.

11 Claims, 11 Drawing Figures

TOWER PACKING ELEMENTS

This invention is concerned with improvements in and relating to tower packing elements for use in fluid-fluid contact apparatus of the packed tower type and, more particularly, is concerned with metallic tower packing elements.

Fluid-fluid contact apparatus of the packed tower type is well known. Thus, generally, such apparatus comprises a tower packed with one or more beds of packing elements and means for introducing fluids into the tower for contact therein. A wide variety of packing elements for forming the beds in such apparatus is known and the present invention is concerned with packing elements of the ring type, i.e. packing elements comprising as a principal member an open-ended tubular member. Examples of such metallic tower packing elements include metallic Pall-type rings which comprise a tubular member having a plurality of apertures with inwardly directed tabs springing from the apertures and in which the ratio of the length to diameter of the tubular element is generally equal to unity. Other such metallic tower packing elements are so-called "Cascade Minirings" comprising a tubular member with one or more inwardly directed ribs or protuberances extending from the inside walls of the tubular member. Such "Cascade Minirings" have a height (i.e. longest measurement in a direction parallel to the longitudinal axis of the tubular member) to diameter (i.e. maximum dimension in a plane perpendicular to the longitudinal axis of the tubular member) ratio of less than unity, preferably less than 1:1.5, preferably from 1:1.5–1:10, more preferably 1:2.5–1:5. Such rings are, for example, described in British Patent Specification No. 1,385,672.

Tower packing elements of the above type are commonly formed from metal strip by bending the strip to form the desired tubular member and, if necessary, punching the strip to form inwardly directed ribs or tabs with corresponding apertures in the walls of the tubular member. However, rings formed in this manner suffer from the disadvantage that, unless particular steps are taken, the ends of the bent strip merely abut each other so that the rings formed thereby suffer from a potential mechanical weakness.

It is an object of the present invention to provide metallic tower packing elements comprising a tubular member which may be readily formed by a bending and punching operation but wherein the whole of the ring is formed in an integral manner.

Broadly the present invention provides a metallic packing element comprising a pair of curved strips connected together at their respective ends to form a generally tubular member by a pair of generally co-planar bridge members integral with the said ends of the curved strips.

In the following description reference will be made to the accompanying drawings, in which.

Figure 1:
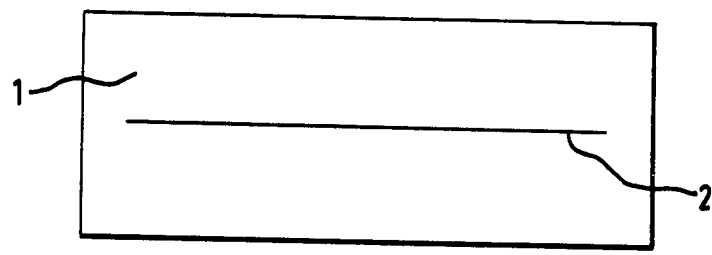
FIG. 1 represents a blank for the formation of a simple packing element in accordance with the invention.
Figures 2, 3:
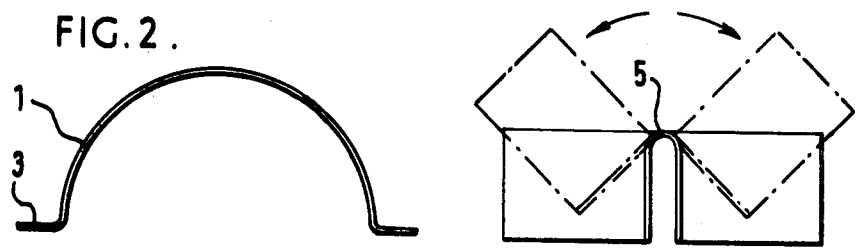
FIG. 2 is a side elevation of a curved blank as shown in FIG. 2.
FIG. 3 is an end view of a folded curved blank as shown in FIG. 2.
Figures 4, 5:
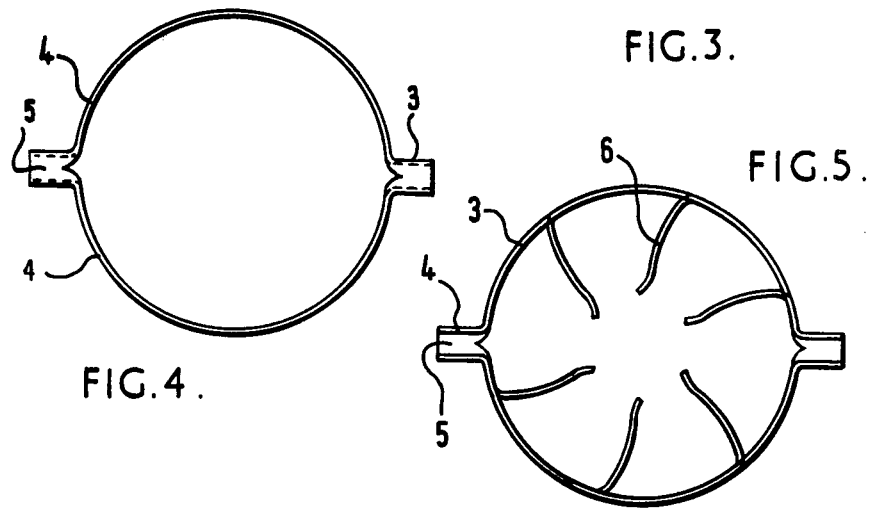
FIG. 4 is a plan view of a packing element in accordance with the invention formed by fully folding the curved blank shown in FIG. 2.
FIG. 5 is a plan view of a preferred form of packing element in accordance with the invention.

The packing elements in accordance with the present invention are conveniently prepared from strip metal and may be formed by first making a cut 2 in a blank 1 (see FIG. 1) of a strip of the desired metallic material. The blank 1 is then curved to form a curved blank (see FIG. 2) having lugs 3 corresponding to the uncut end portion of the blank 1 and this is subsequently folded along the axis of the cut 2 (see FIG. 3) to form the packing elements in accordance with the invention (see FIG. 4). Thus, as will be seen from FIG. 4 of the drawings, a packing element in accordance with the invention comprises a pair of curved strips 4 linked together by bridge members 5 integral with lugs 3 at the respective ends of curved strips 4.

In the drawings, the tubular member comprising the packing element in accordance with the invention is shown as being generally circular in cross-section and, indeed, this being the preferred form of packing element in accordance with the invention. However, the tubular member forming the packing element in accordance with the invention may be of any desired cross-section provided, of course, that the two strips 4 (see FIG. 4) together with the bridging members 5 form a closed curve.

Thus, if desired, the packing element of the invention may be of polygonal cross-section, e.g. rectangular or hexagonal, or the curved strips may take any form of smooth curve.

Figures 6, 7:
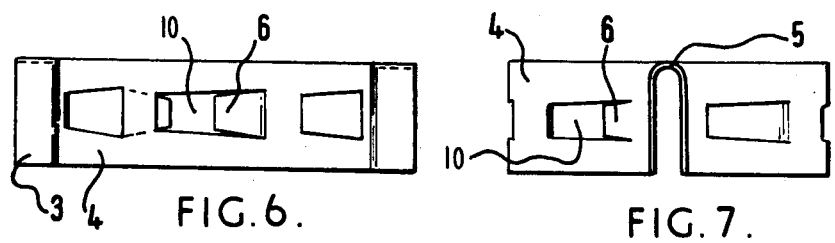
FIG. 6 is a side elevation of the packing element shown in FIG. 5.
FIG. 7 is a side elevation of the packing element shown in FIG. 5 viewed at 90° to that shown in FIG. 6.

It is generally preferred that the packing elements in accordance with the invention be provided with inwardly directed ribs 6 (see FIGS. 5 and 6 of the accompanying drawings) and these will generally be associated with corresponding apertures 10 in the walls of the tubular member and will be formed by punching from the walls of the tubular member at some convenient stage during the formation of the tubular member.

Figure 8:
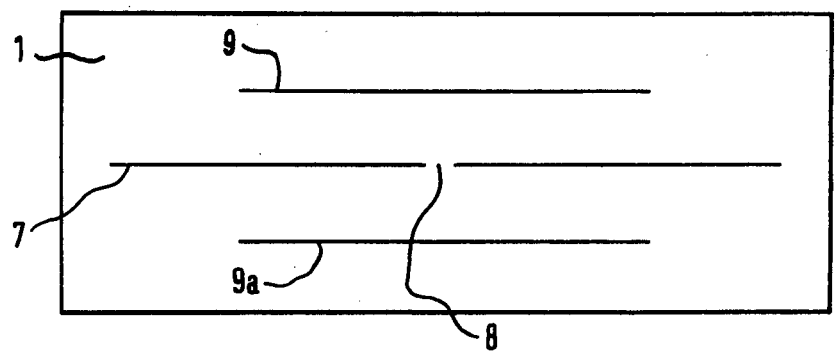
FIG. 8 is a plan view of a blank for forming a preferred packing element in accordance with the invention.
Figure 9:
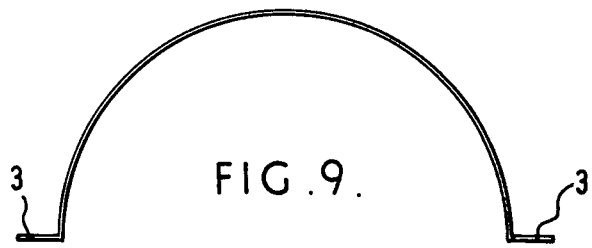
FIG. 9 is a side view of a curved blank as shown in FIG. 8.
Figure 11:
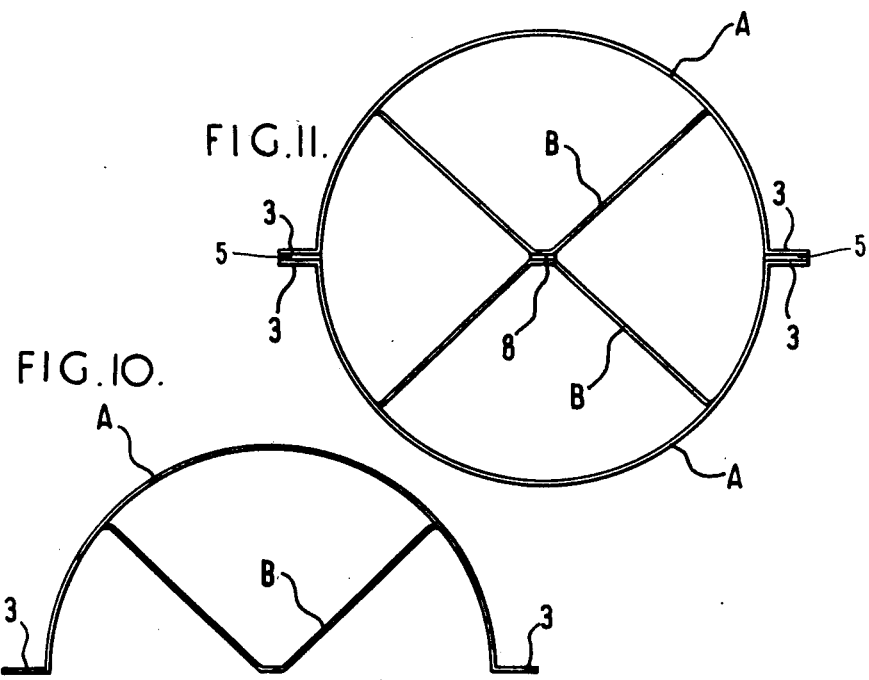
FIG. 11 is a plan view of a packing element formed by folding the blank as shown in FIG. 10.
Figure 10:
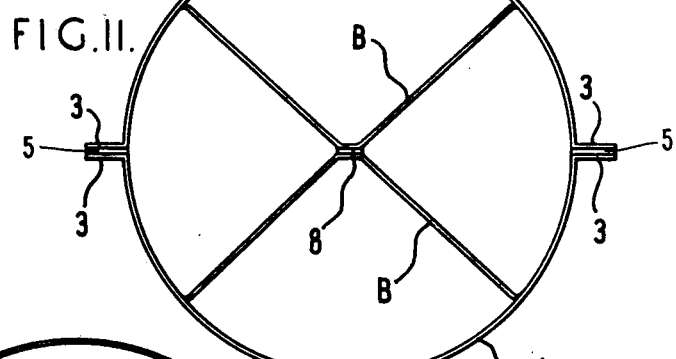
FIG. 10 is a side view of a curved, further bent blank as shown in FIG. 9.

In accordance with another preferred feature of the invention the packing elements in accordance with the invention are provided with radial ribs which may meet, or preferably are connected together, at the centre of the element. Such packing elements may be formed as described with reference to FIGS. 8–11 of the drawings. Thus such elements may be formed from a blank 1 (see FIG. 8 of the drawings) having therein three cuts, namely a discontinuous cut 7 interrupted at 8 and two supplementary cuts 9 and 9a, thereby dividing the blank into four linear regions, namely outer regions A and regions B. This blank is then curved to form a curved blank (see FIG. 9) having lugs 3 corresponding to the uncut end portion of blank 1. Portion B of the curved blank are then pressed away from portion A of the ring so that the blank assumes the shape shown in FIG. 10 of the drawings. This blank is then folded along the axis of cut 7 to form a packing element in accordance with the invention having radial ribs joined by bridge 8 and formed by linear parts B of the blank, linear portion A of the blank forming the tubular portion of the element and being connected by bridges 5. In a modification of this form of packing element cut 7 may have an uninterrupted cut so that the radial ribs formed by linear portion B are connected at the centre of the ring but merely abut there or may even be spaced apart from each other. However, from a strength consideration it is generally preferred that the radial ribs be joined together at the centre of the element and thus, where the ribs are not joined by a bridge 8 as described above, they may be otherwise joined together; for example by riveting, welding, etc.

As shown in the drawings, the bridge members 5 extend outwardly of the tubular member formed from the strips 4 but this is not essential and thus, for example, the bridge members 5 may be located inwardly of the curved strips 4 by first bending the margins of the blank 1 outward of the slit 2 (see FIG. 1) inwardly and subsequently curving and folding the resultant blank.

If desired, the mechanical rigidity of the packing elements in accordance with the invention may be improved by securing the lugs 3 of the element together, for example by welding or by some mechanical means such as riveting.

The packing elements of the invention may be used in wide variety of packed towers such as, for example, distillation, absorption, extraction and scrubbing towers.

Accordingly another embodiment of the invention provides fluid-fluid contact apparatus provided with a packed bed formed of the packing elements of the invention and such a bed may be a stacked or, more commonly, a dumped bed of the elements in accordance with the invention.

I claim:

1. In a packed tower fluid-fluid contact apparatus having a tower packed with at least one bed of packing elements and means for introducing fluid into the tower for contact therein, the improvement wherein at least some of said packing elements are metallic, each of said metallic packing elements comprising a pair of curved strips connected together at their ends by a pair of generally coplanar bridge members and folded together with said ends of the curved strips in confronting relationship to each other so that a generally tubular member is formed.

2. The improvement according to claim 1, wherein said packing elements are each completely formed from a one-piece metal blank curved and folded upon itself.

3. The improvement according to claim 2, wherein said metal blank includes at least one central longitudinal slit means for folding the metal blank therealong.

4. The improvement according to claim 2, wherein said bridge members are formed integrally with the ends of the curved strips and are directed generally radially outwardly.

5. The improvement according to claim 2, wherein said bridge members are formed integrally with the ends of the curved strips and are directed generally radially inwardly.

6. The improvement according to claim 1, wherein said packing elements have a height to diameter ratio of from 1:1.5 to 1:10.

7. The improvement according to claim 6, wherein said ratio is from 1:2.5 to 1:5.

8. The improvement according to claim 2, including ribs formed from said metal blank and extending inwardly from the curved strips of the tubular member.

9. The improvement according to claim 8, wherein the curved strips include apertures.

10. The improvement according to claim 8, wherein said ribs are connected together at the longitudinal axis of the tubular member.

11. The improvement according to claim 2, wherein said metal blank includes a pair of central, colinear longitudinal slit means for folding the metal blank therealong, each of said pair of central longitudinal slit means being spaced from each other, and a further longitudinal slit means for dividing the metal blank into regions, said further longitudinal slit means being arranged on each side of and substantially parallel with said pair of central longitudinal slit means.

* * * * *